United States Patent [19]

Field

[11] Patent Number: 4,725,887
[45] Date of Patent: Feb. 16, 1988

[54] METHOD OF AND APPARATUS FOR PROCESSING VIDEO SIGNALS

[75] Inventor: Anthony J. Field, Cambridge, United Kingdom

[73] Assignee: U.S. Philips Corporation, New York, N.Y.

[21] Appl. No.: 775,068

[22] Filed: Sep. 11, 1985

[30] Foreign Application Priority Data

Sep. 14, 1984 [GB] United Kingdom ............... 8423324

[51] Int. Cl.⁴ .......................................... H04N 5/14
[52] U.S. Cl. ..................................... 358/160; 358/167
[58] Field of Search ............... 358/160, 22, 185, 180, 358/163, 182, 36, 167; 340/727, 728, 747; 382/46, 47, 44

[56] References Cited

U.S. PATENT DOCUMENTS

| 4,199,780 | 4/1980 | Taylor | 358/36 |
| 4,287,529 | 9/1981 | Tatami et al. | 358/163 |
| 4,437,121 | 3/1984 | Taylor et al. | 358/160 |

FOREIGN PATENT DOCUMENTS

2119197 11/1983 United Kingdom .
2160740 12/1985 United Kingdom ............... 358/36

Primary Examiner—James J. Groody
Assistant Examiner—David E. Harvey
Attorney, Agent, or Firm—Thomas A. Briody; William J. Streeter; Gregory P. Gadson

[57] ABSTRACT

An arrangement for processing video signals, the video signals having the form of digitally encoded samples and being arranged to produce a television picture by line and field sequential scanning includes a frame store, a write address generator and a read address generator. Input video samples are fed from an input to an interpolator for writing into the store. When a television picture is to be rotated and the rotation is effected by the sequence of write addresses to the store a situation can arise where there is no information available for writing into certain store locations. This results in holes appearing in the output signal where no picture related information is present. A hole detector is provided at the store output and controls an interpolator which inserts information derived from adjacent picture samples into the hole.

16 Claims, 6 Drawing Figures

METHOD OF AND APPARATUS FOR PROCESSING VIDEO SIGNALS

ND OF THE INVENTION

The invention relates to a method processing video signals having the form of digitally encoded samples and being arranged so that successive samples produce a television picture on a display screen by line and field sequential scanning, the method comprising the steps of:
- (a) receiving from a video signal source an input video signal comprising successive video signal samples representing an input television picture;
- (b) applying to said input television picture a given geometrical modification by:
- (b1) determining on the basis of said given geometrical modification a set of addresses for addressing memory locations of a video frame store;
- (b2) assigning to each sample of the input video signal or to samples derived therefrom a memory location indicated by an address of said set of addresses;
- (c) reading video signal samples from at least a selected part of said video frame store.

The invention also relates to apparatus for processing video signals having the form of digitally encoded samples and being arranged so that successive samples produce a television picture on a display screen by line and field sequential scanning, the apparatus comprising a frame store, a first address generator for generating a set of addresses for addressing memory locations in the frame store the set of addresses being generated from input signals defining a given geomerical modification of the input television picture represented by input video signal samples, said first address generator being effective to assign to each sample of input video signal or samples derived therefrom a memory location indicated by an address of said set of addresses, and a second address generator for generating addresses of at least a selected part of the frame store to enable video signal samples to be read successively from each location of the selected part of the frame store to form a series of video signal samples which represent the modified television picture.

Such a method and apparatus have been disclosed in UK Patent Application No. 2119197A which describes how the method and apparatus may be used to store a television picture in a field store at a selected rotational angle. In television broadcasting there is often a requirement for studio equipment which is capable of rotating a video image for producing special effects. The field store stores picture element samples in an analog of the television picture and is arranged to be read on a line and field sequential scanning basis. The rotation of the picture is achieved by suitably modifying the input addressing to write the input video signals into selected locations in the store so that a rotated image is stored. One problem in such a system is that at certain angles of rotation there is insufficient input information to fill every location in the store. Thus when the store is read out holes appear in the displayed picture, that is certain picture elements are missing because there was no sample information stored in a particular store location. The same problem will occur with other modifications of the input television picture which involve expansion of part of the picture when the manipulation is effected by modifying the input addresses applied to the store.

SUMMARY OF THE INVENTION

It is an object of the invention to enable the provision of a method of processing video signals and apparatus for processing video signals in which the visible effect of such holes can be minimised.

The invention provides a method of processing video signals as set forth in the opening paragraph characterized by the further steps of:
- (d) determining whether there were memory locations of said selected part to which no sample has been assigned;
- (e) generating a control signal when a memory location to which no sample has been assigned is detected; and
- (f) inserting under control of said control signal, a substitute sample generated from at least one adjacently located sample, at a location in the successive samples read out from the store, which location corresponds to said memory location to which no sample has been assigned.

By examining the video signal samples read from the frame store the existence of holes can be detected and the holes replaced by samples which are derived from adjacent samples, either individual samples or interpolated values between a number of samples adjacent to the hole.

During said determining step (d) it may be determined whether more than a given number of successive memory locations to which no sample has been assigned exist, inserting step (f) then being performed only if the number of successive memory locations to which no sample is assigned is not more than the given number. The given number may be one.

This enables the difference between a hole and the edge of a picture frame to be determined since it is assumed that if more than a given number of successive locations contain data which produces a hole in the picture then the edge of the picture has been reached and in that case picture related sample data is not inserted into the output signal.

The method may be characterized by the step of writing a non-valid sample which comprises coded information lying outside the limits defining a valid sample; into all the memory locations of at least said selected part of the frame store before said step (b2) of assigning memory locations.

By these means it is a simple matter to detect whether or not a picture signal sample has been read into any particular location in the frame store since the detection of a non-valid sample value will indicate that no signal sample has been written in that particular location.

The method may be characterized by the steps of dividing the store into three parts and cyclically for each of the three parts writing a non-valid code into all locations, writing input video samples into the locations indicated by said set of addresses, and reading samples from all locations such that during a field in which a non-valid code is written into the first part, input video samples are written into the second part and samples are read from the third part.

A non-valid sample may be written into all locations of the selected part of the store during the line and field blanking periods.

The given geometrical modification of the input television picture may be a rotation about an axis perpendicular to the plane of the picture and/or one or both of two axes in the plane of the picture and in which case the set of addresses is determined from a given angle of rotation and axis about which the rotation is to take place.

The invention further relates to apparatus for processing video signals as set forth in the second paragraph characterized by means for determining whether there were memory locations of said selected part to which no sample has been assigned, means for generating a control signal when a memory location to which no sample has been assigned is detected, a substitute sample generator for generating a substitute sample from at least one adjacently located sample, and means for inserting, under the control of the control signal, a substitute sample at a location in the successive samples read out from the store, which location corresponds to said memory location to which no sample has been assigned.

Said determining means may determine whether more than a given number of successive memory locations to which no sample has been assigned are present, said inserting means then inserting substitute samples only if the number of successive memory locations to which no sample has been assigned is not more than the given number, which number may be one.

Means may be provided for writing a non-valid sample which comprises coded information lying outside the limits defining a valid sample into all the memory locations of at least the selected part of the frame store. Said determining means may determine whether a non valid signal has been read out of the frame store.

The substitute sample generating means may comprise an interpolator for generating a sample from two or more adjacent samples. The interpolator may be arranged to produce a substitute sample having the average value of the preceding and succeeding samples.

The non-valid code may be the binary equivalent of a decimal number within the range 0 and 15 or 241 and 255.

BRIEF DESCRIPTION OF THE DRAWINGS

An embodiment of the invention will now be described by way of example with reference to the accompanying drawings, in which.

DETAILED DESCRIPTION OF THE INVENTION

Figure 1:
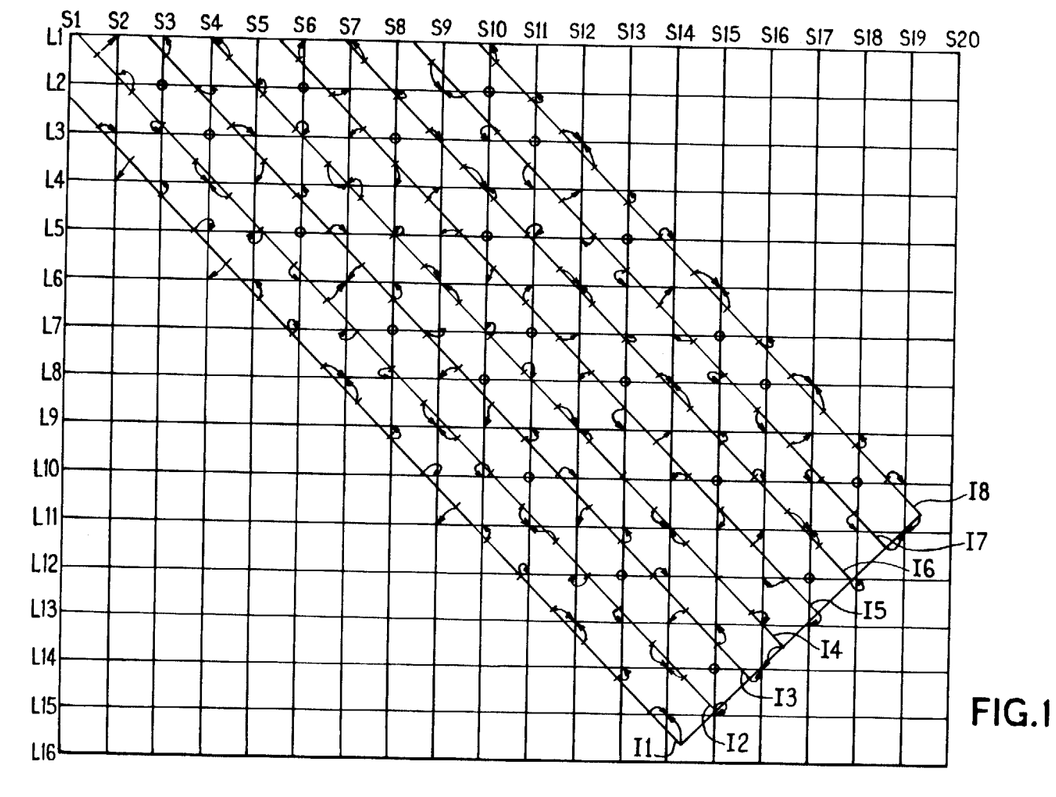
FIG. 1 shows input and output planes of the frame store and illustrates the generation of holes in the television picture.

FIG. 1 illustrates that when a picture to be stored in a frame store is rotated by means of modifying the sequence of write addresses certain locations in the store have no sample information written into them if the arrangement is such that input signal samples are stored in the nearest location. Thus in FIG. 1 input signal samples are represented by crosses on the lines I1 to I8 and store locations are at the intersections of the lines L1 to L16 with lines S1 to S20. As can be seen from FIG. 1 at those intersections marked with a circle no sample information is available to be written into the store. As a result, when the samples are read out from the store, the picture contains a pattern of holes where empty store locations are read. The precise pattern depends on the angle of rotation and the degree of expansion of the picture. Thus a pattern is produced on the displayed picture in which certain points have no picture related information.

In order to overcome this problem the operation of the frame store is controlled so that in a first period all locations (or all locations of a part of the field store) are filled with non-valid data (for example an all zero code). In a second period video signal samples are written into selected locations and in a third period data is read from all locations. The samples read from the store are then examined to determine whether they contain valid or non-valid data and if non-valid data is detected this is replaced by data derived from an adjacent sample or samples. It has been discovered that holes formed do not normally contain more than one sample in the line scan direction and that consequently if two or more successive samples comprise non-valid data then the edge of the picture has been reached. In this case the non-valid data is not replaced by picture related samples.

Figure 2:
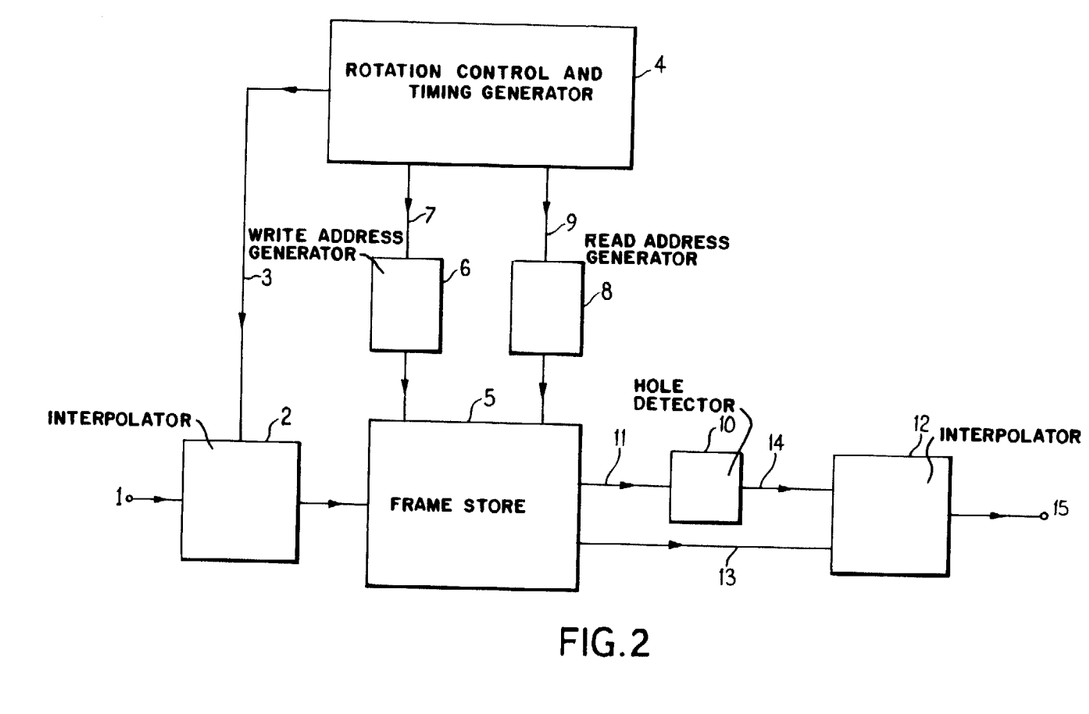
FIG. 2 is a block diagram of an arrangement for processing video signals according to the invention.

FIG. 2 shows an arrangement for carrying out the method according to the invention. The arrangement comprises an input 1 to which a video signal in the form of binary coded samples at a repetition rate of 13.5 MHz is applied. The input video signal is fed to an interpolator 2 which is controlled over a line 3 by a rotation control and timing generator 4. The output of the interpolator 2 is fed to a frame store 5 where it is written into selected locations by means of a write address generator 6 which is controlled over a line 7 by the rotation control and timing generator 4. Successive samples are read from the frame store 5 by means of a read address generator 8 which is controlled over a line 9 by the rotation control and timing generator 4 and are applied to a hole detector 10 over a line 11 and to an interpolator 12 over a line 13. The interpolator 12 is controlled by the hole detector 10 over a line 14 and the output of the interpolator 12 is fed as the output video signal to an output 15.

Figure 3:
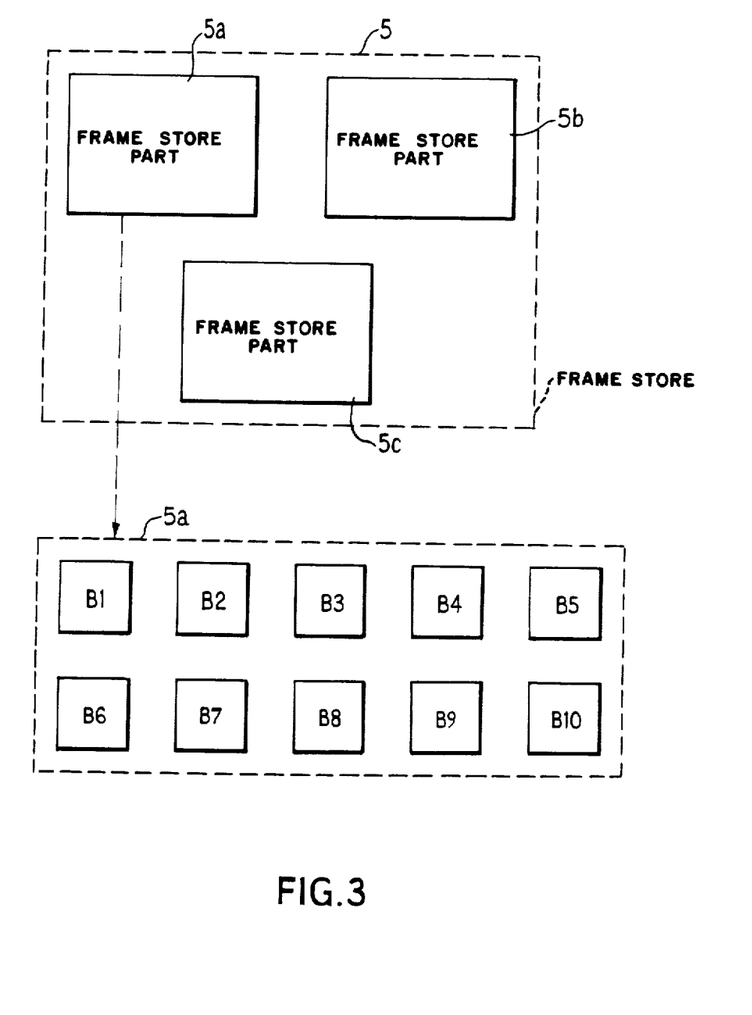
FIG. 3 illustrates diagrammatically the layout of the frame store.

As is shown diagrammatically in FIG. 3 the frame store 5 is divided into three parts 5a, 5b, and 5c, each of which is capable of storing samples forming a television frame. During one frame non-valid data is being written into part 5a, input samples are being written into selected locations in part 5b, and stored samples are being read from part 5c. Subsequently non-valid data is written into part 5c, samples are read from part 5b and input samples are written into selected locations of part 5a. Then non-valid data is written into part 5b, samples are read from part 5a and input samples are written into selected locations of part 5c. This sequence is then continuously repeated. Thus, for each part the cycle of write non-valid data, write input video signal sapmles into selected locations, and read stored samples is continuously repeated frame by frame.

The samples read from each part of the store in turn are fed to a hole detector 10 which determines whether the sample read contains non-valid data and if so whether the preceding or succeeding sample also contains non-valid data. If the hole detector 10 discovers that an isolated sample contains non-valid data, that is that the preceding and succeeding sample contain valid video signal samples, then it decides that a hole has been detected and applies a signal to the interpolator 12 to cause it to average the preceding and succeeding samples and to feed the averaged sample value to the output 15 in place of the non-valid sample data. If two successive samples containing non-valid data are detected then it is assumed that the edge of the picture has been reached and the non-valid data is fed to the output 15.

Figure 4:
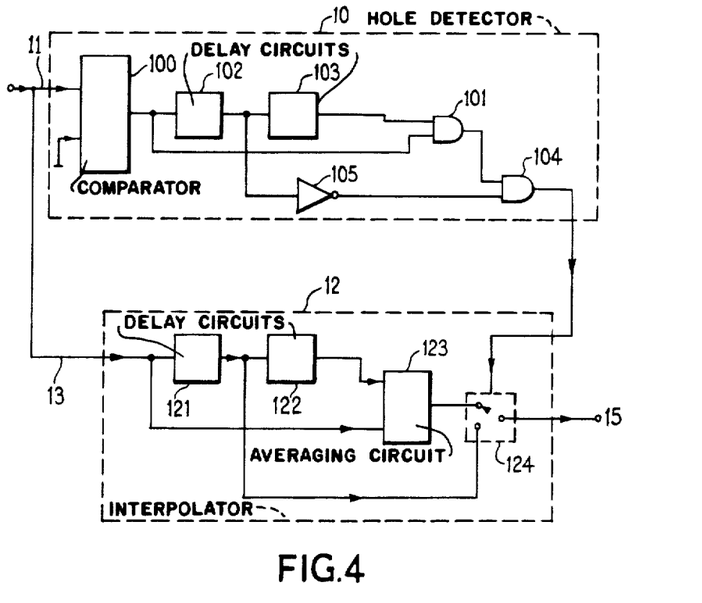
FIG. 4 shows in greater detail the hole detector and interpolator.

FIG. 4 shows the hole detector 10 and interpolator 12 in greater detail. The hole detector 10 comprises a comparator 100 to one set of inputs which the sample read from the store 5 is applied via line 11. The other set of inputs of the comparator is connected to a pre-set code, for example all zeros. If the two sets of inputs coincide the comparator produces an output which is fed directly to a first input of an AND-gate 101 and via a series arrangement of two delay circuit 102 and 103 to a second input of the AND-gate 101. The output of AND-gate 101 is connected to a first input of AND-gate 104 whose output is connected to the line 14. The junction of the two delay circuits 102 and 103 is fed via an inverter 105 to a second input of the AND-gate 104. The delay circuits 102 and 103 both produce a one sample delay. The interpolator 12 comprises a series arrangement of two delay circuits 121 and 122 which both produce a one sample delay and an averaging circuit 123. Samples from the store 5 are fed via line 13 to the input of the delay circuit 121 and to one input of the averaging circuit 123. The other input of the averaging circuit is connected to the output of the second delay circuit 122. The output of the averaging circuit 123 is fed a first input of a changeover switching arrangement 124 while the junction of the delay circuits 121 and 122 is connected to the other input of the changeover switching arrangement 124. The output of the changeover switching arrangement 124 is connected to the output 15 while the line 14 is connected to a control input of the changeover switching arrangement 124.

Specifications for digital video signals encoded as an 8-bit code define black level as decimal 16 and peak white as decimal 240. Consequently any value under decimal 16 or between 241 and 255 is a non-valid code. By writing a sample containing all zeros into each store location before writing in samples, any location which has not had a sample written into it can be detected on read out by detecting zero valued samples. Clearly any non-valid code, that is 0–15 or 241–255, could be written into the store initially.

The hole detector 10 shown in FIG. 4 operates as follows: When the sample read from the store contains all zeros the comparator 100 produces a binary '0' output but for all other sample values it produces a binary '1' output. A hole is detected if three successive samples cause the comparator 100 to produce the sequence '101' in that case the output of the delay circuit 103 is at a binary '1' the output of the delay circuit 102 is at a binary '0' and the output of the comparator 100 is at a binary '1'. As a result the output of AND-gate 104 is at a binary '1' indicating that a hole is present. This output causes the changeover switching arrangement 124 to adopt the state shown in FIG. 4 and consequently the output signal at output 15 is the average of the preceding and succeeding samples. When no hole is detected the cangeover switching arrangement 124 adopts the other state and the output sample at output 15 is derived from the output of delay circuit 121. While it is considered unlikely that sucessive sample locations will not contain valid data if such situations were found it would clearly be possible to modify the hole detector 10 to detect when two or more successive storage locations contain non-valid data and to arrange for valid samples from the surrounding area to be used to generate samples to be substituted for the non-valid values. In such a case a more extensive inerpolator than the one illustrated would of course be required.

Figure 5:
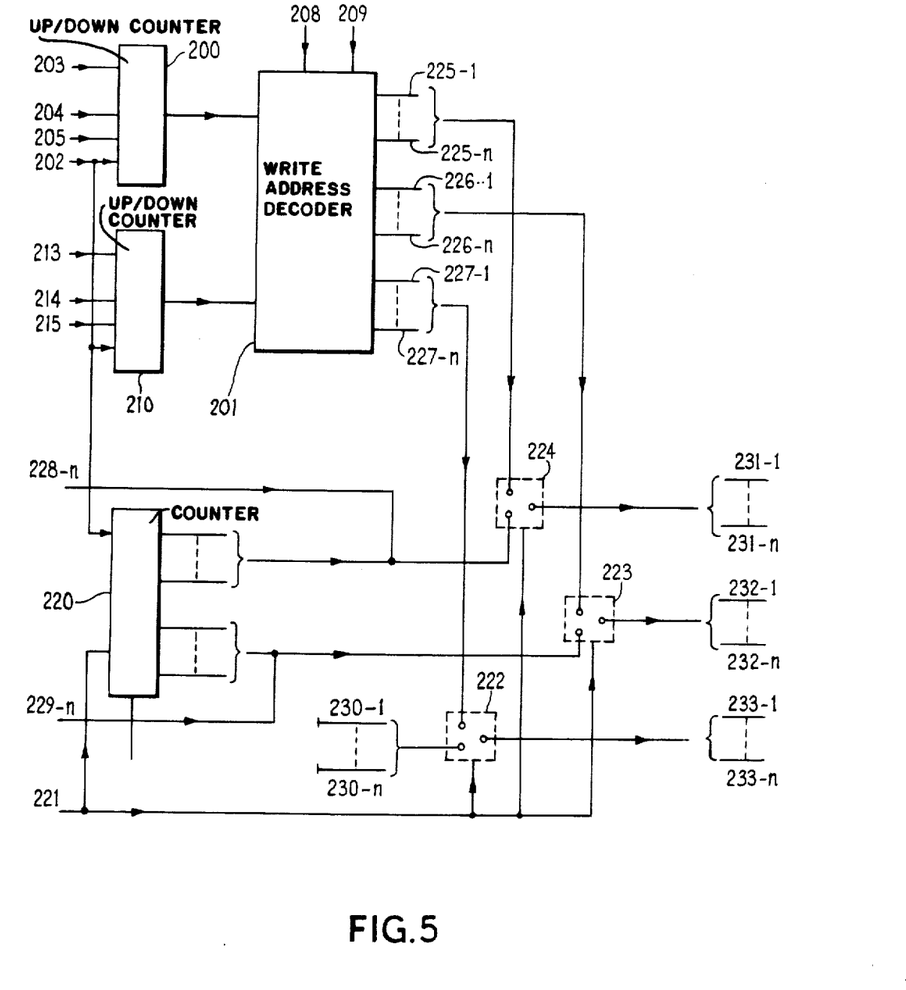
FIG. 5 is a block diagram of the store write address generator.

The store write address generator 6 is shown in greater detail in FIG. 5. It comprises first and second up/down counters 200 and 210 which fed a write address decoder 201. The write address decoder 201 may comprise a read only memory which is programmed to convert the sequential addresses produced by the counters 200 and 210 to the address format of the frame store 5. The counters 200 ad 210 have a clock input which is fed via a line 202 with the sample rate clock from the timing generator 4, presetting inputs which are fed via lines 203 and 213 from the rotation control, and increment, decrement and enable inputs which are fed via lines 204, 214, 205 and 215 from the rotation control. The write address decoder 201 has two further inputs which are fed from outputs of the store area cycle control shown in FIG. 6. These inputs control the area of the store to be addessed 5a, 5b, or 5c.

The arrangement described thus far enables the input picture to be rotated by writing samples into selected locations of the store. The locations addressed being controlled by the rotation control 4 over the lines 203, 204, 205, 213, 214, and 215. In order to write the non-valid data into all locations of one part of the store the write address generator also comprises a further counter 220 which is clocked by the sample rate clock via line 202. The clocking of this counter is enabled only during the line and frame blanking periods by means of a signal on line 221 which controls an inhibit input of the counter. This line is also connected to control inputs of three changeover switching arrangements 222, 223 and 224.

The write address decoder 201 has a first set of outputs 225-1 to 225-n which define the row address of the frame store and are connected to the first input of the changeover switching arrangement 224, a second set of outputs 226-1 to 226-n which define the column address of the frame store and are connected to a first input of the changeover switching arrangement 223, and a third set of outputs 227-1 to 227-n which define sections of the part of the frame store and are connected to the first input of the changeover switching arrangement 222.

As shown in FIG. 3 each part of the frame store 5, that is 5a, 5b, and 5c, is split into ten sections B1 to B10. Conveniently these are located on separate printed circuit boards. The outputs 227-1 to 227-n of the write address decode 201 are used select the particular circuit board or section of each part of the store. the store is arranged so that the input video signal samples are written into the store during the line and frame scanning periods while the non-valid data is written into the selected part of the store during the line and frame blanking periods. Thus the changeover switching arrangements 222, 223 and 224 select either outputs from the write address decode 201 or outputs derived from the address counter 220. Thus outputs 228-1 to 228-n-1 are connected to the second input of the switching arrangement 224 together with a line 228-n which is derived from the store area cycle control shown in FIG. 6. This gives the row address to the frame store. Similarly lines 229-1 to 229-n-1 from the counter 220 are fed to second inputs of the switching arrangement 223 together with the line 229-n which is derived from the store area cycle control shown in FIG. 6. Since the line and frame blanking periods are shorter than the line and frame scanning periods it is necessary to address the part of the store which is filled with non-valid data at a faster rate than the part of the store which is being filled with input video signal samples. To achieve this the separate sections B1 ot B10 are addressed in parallel when the non-valid data is being entered. This is possible because the same data is being written to all locations. To achieve this lines 230-1 to 230-n which are connected to the second input of the switching arrangement 222 are connected to a fixed potential which acts as a board or section enable signal for all the boards or sections.

The output of the switching arrangement 224 is fed to lines 231-1 to 231-n which are connected to the frame store as a row address selection. The output of the switching arrangement 223 is connected to lines 232-1 to 232-n which are connected to the frame store input as column addresses. The output of the switching arrangement 222 is connected to lines 233-1 to 233-n as board selection signals which address particular sections of each area of the frame store.

Figure 6:
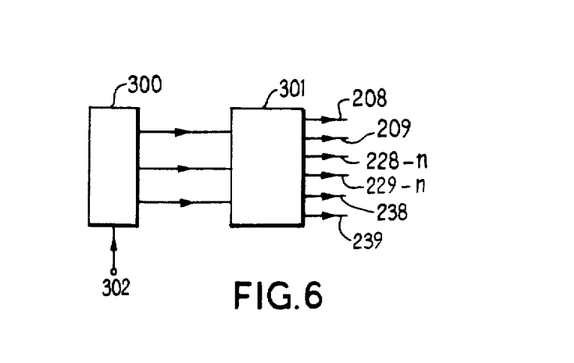
FIG. 6 shows an arrangement for cyclically allocating the various parts of the store to the write and read functions.

FIG. 6 shows an arrangement for cyclically selecting each of the three parts of the store. The arrangement in FIG. 3 coprises a ring counter 300 which is fed with frame pulses via a line 302 and whose outputs are connected to a read only memory 301. The read only memory is programmed so that the outputs on lines 208 and 209 change state with each count of the ring counter so that the binary code on the lines 208 and 209 cause the write address decode to cyclically address the three different parts of the store changing part on each frame pulse. Similarly the outputs on lines 228-n and 229-n cause the area addressed by the non-valid code address counter to cyclically pass through the three parts, the non-valid address part being offset from the input video sample address decode. Similarly on lines 238 and 239 codes which follow the ring counter cycle cause the read address generator to cyclically read from the three separate parts in such a way that it always reads information from the part of the store that had been written with input samples in the previous frame.

While in principle the store needs to be split into three separate parts to enable the writing of invalid codes into one part while input video signals are written into a second part and the output samples are read from the third part it is of course possible to add one or more further parts to the store in which no action is carried out. This may be done for example because of the ease of implementation with standard integrated circuits. If for example a fourth area is added then the ring counter 300 would have four steps but the read only memory 301 need have no more outputs as two lines are sufficient to define four states.

I claim:

1. A method of processing a video signal in which the video signal has the form of successive digitally encoded samples being arranged so that said successive samples represent a television picture displayable by line and field sequential scanning, the method comprising the steps of:
   (a) receiving from a video signal source said video signal comprising said successive samples representing said television picture;
   (b) applying to said television picture a preselected geometrical modificaton by:
   (b1) determining by characteristics of said preselected geometrical modification to be applied, a set of addresses for addressing selected memory locations of a video frame store;
   (b2) storing one of the successive samples of the video signal in espective ones of said selected memory locations;
   (c) reading successive memory locations of at least a selected part of said video frame store to produce a data stream; characterized, by the further steps of:
   (d) identifying locations in said data stream corresponding to ones of said successive memory locations being read in which no video sample was stored;
   (e) generating a control signal in response to each of the identified locations; and
   (f) inserting under control of said control signal at said each identified location, a substitute sample generated from at least one of said video samples located adjacently in said data stream to said each identified location.

2. A method as claimed in claim 1, in which during said identifying step (d), the number of adjacent identified locations is determined, and said inserting step (f) is performed only if the number of adjacent identified locations does not exceed a predefined number.

3. A method as claimed in claim 2, in which the predefined number is unity.

4. A method as claimed in any one of claims 1, 2 or 3, characterized by the step of writing a non-valid sample which comprises coded information lying outside of predefined limits of said video sapmles into all the memory locations of at least said selected part of the frame store before said step (b2) of storing.

5. A method as claimed in claim 4, in which said identifying step (d) comprises determining whether asid non-valid sample occurs at locations in the data stream.

6. A method as claimed in claim 3, further characterized by a step of dividing the store into three parts and said storing and reading step comprising cyclically for each of the three parts writing a non-valid code into all of the memory locations, storing the ones of the video samples in the selected memory locations, and reading the successive memory locations such that during a period in which the non-valid code is written into the first part, video samples are written into the second part and samples are read from the third part.

7. A method as claimed in claim 6, in which said non-valid sample is written into all memory locations of the selected part of the store during the line and field blanking periods of the video signal.

8. A method as claimed in any one of claims 1-3 or 6-7 in which the given geometrical modification of the television picture is a rotation about an axis perpendicular to the plane of the picture and/or one or both of two axes in the plane of the picture and in which the set of addresses is determined from a given angle of rotation and axis about which the rotation is to take place.

9. Apparatus for processing a video signal having the form of successive digitally encoded samples being arranged so that said successive samples represent a television picture displayable by line and field sequential scanning, the apparatus comprising a frame store, a first address generator for generating a set of addresses for addressing memory locations in the frame store, the set of addresses being generated from input signals defining a preselected geometrical modification of the television picture, said first address generator being effective to satore ones of the successive samples of the video signal in respective ones of said selected memory locations, and a second address generator for generating addresses of at least a selected part of the frame store to enable memory locations to be read successively from each location of the selected part of the frame store to produce a data stream, characterized by means for identifying locations in said data stream corresponding to ones of said successive memory locations being read in which no video sample was stored, means for generating a control signal in response to each of the identified locations, a substitute sample generator for generating a substitute sample from at least one of said video samples located adjacently in said data stream to said each identified location, and means for inserting, under the control of the control signal, the substitute sample at said each identified location in the data stream.

10. Apparatus as claimed in claim 9, characterized in that said identifying means determines, the number of adjacent identified locations, and said inserting means inserts substitute samples only if the number of adjacent identified locations does not exceed a predefined number.

11. Apparatus as claimed in claim 10, in which the predefined number is unity.

12. Apparatus as claimed in any one of claims 9, 10 or 11, characterized by means for writing a non-valid sample which comprises coded information lying outside of predefined limits of said video samples into all the memory locations of at least the selected part of the frame store.

13. Apparatus as claimed in claim 12, characterized in that said identifying means determines whether said non-valid sample occurs at locations in the data stream.

14. Apparatus as claimed in any one of claims 9 to 11, characterized in that the substitute sample generating means comprises an interpolator for generating the substitute sample from two or more of said video samples located adjacently in said data stream to said each identified location.

15. Apparatus as claimed in claim 14, in which the interpolator is arranged to produce the substitute sample having the average value of the preceding and succeeding video samples.

16. Apparatus as claimed in any of claims 9 to 11, characterized in that the non-valid code is the binary equivalent of a decimal number within the range 0 and 15 or 241 and 255.

* * * * *

UNITED STATES PATENT AND TRADEMARK OFFICE
CERTIFICATE OF CORRECTION

PATENT NO. : 4,725,887
DATED : February 16, 1988
INVENTOR(S) : Anthony J. Field

It is certified that error appears in the above-identified patent and that said Letters Patent is hereby corrected as shown below:

IN THE CLAIMS

Column 8, Claim 1, line 8, change "espective" to --respective--

Column 8, Claim 4, line 34, change "sapmles" to --samples--

Column 8, Claim 5, line 38, change "asid" to --said--

Column 9, Claim 9, line 3, change "satore" to --store--

Signed and Sealed this

Seventh Day of March, 1989

*Attest:*

DONALD J. QUIGG

*Attesting Officer*   *Commissioner of Patents and Trademarks*